UNITED STATES PATENT OFFICE.

WILLIAM E. WHITEHEAD, OF MILES PLATTIN, ENGLAND, ASSIGNOR TO WHITEHEAD & ATHERTON MACHINE COMPANY, OF LOWELL, MASS.

BEATER AND CYLINDER FOR COTTON-OPENERS, &c.

SPECIFICATION forming part of Letters Patent No. 240,483, dated April 19, 1881.

Application filed December 22, 1880. (No model.)

*To all whom it may concern:*

Be it known that I, WILLIAM E. WHITEHEAD, of Miles Plattin, England, temporarily residing in Tewksbury, Massachusetts, have invented certain new and useful Improvements in Beaters and Toothed Cylinders for Machinery for Preparing or Opening Cotton and other Fibrous Material, of which the following is a specification.

This invention consists, essentially, in the application and use, substantially as hereinafter set forth, of the metal called "phosphor-bronze" in and for the manufacture of beaters and toothed cylinders of machinery for opening or preparing cotton or other fibrous material.

To enable others to understand my invention, I shall proceed to explain its nature and advantages by reference to its use in the manufacture of beaters. I desire it to be distinctly understood, however, that the same statements will hold true, the necessary change being made, with respect to its application in the manufacture of the toothed cylinders of opening and preparing machinery.

Beaters in machinery of this kind have hitherto been made of steel, this material being employed in order that the beater blade or bar may retain a sharp edge while working in the cotton. It frequently happens, however, that while thus operating the steel beater comes in contact with foreign substances—such as iron or stone—in the cotton, and "strikes fire" or produces a spark. A large percentage of fires in cotton-mills is due to this cause, and it has become a thing desired to provide some means of remedying the trouble. It is essential that the material of which the beater is made should be very hard and resistant, so that the beater may retain its sharp edge; but it is equally essential that this material should be of such nature that it will not strike fire or produce a spark when brought in forcible contact with hard foreign substances in the cotton.

I have discovered, after numerous and long-continued experiments, that the metal called "phosphor-bronze" possesses these two qualifications. It is hard, so that the beater will retain a sharp edge quite as well as if it were made of steel, and it has the additional and great advantage of not emitting a spark when brought in contact with another hard material, so that a phosphor-bronze beater will strike the scraps or pieces of iron or stone which may be mixed in with the cotton without striking fire or producing any spark. In this way I eradicate the cause of many of the fires in cotton-mills, producing a beater which, while equaling a steel beater in durability and working quality or capacity, can be used with entire safety.

I remark that while it is essential that the beater blades or bars—or, in other words, those parts which act directly on the cotton—should be made of phosphor-bronze, the other portions of the beater—such as the hub or hubs and arms, either or both—may be made of the same material as heretofore, and I wish it to be understood that my claim includes any such modifications.

What I claim, and desire to secure by Letters Patent, is—

A phosphor-bronze beater or toothed cylinder for machinery for preparing or opening cotton and other fibrous material, substantially as hereinbefore set forth.

In testimony whereof I have hereunto set my hand this 15th day of December, 1880.

WILLIAM ED. WHITEHEAD.

Witnesses:
A. T. ATHERTON,
SAMUEL B. WYMAN.